(12) United States Patent
Klein et al.

(10) Patent No.: US 7,082,693 B2
(45) Date of Patent: Aug. 1, 2006

(54) ADJUSTING APPARATUS FOR DEVICES AND FOR SETTING ADJUSTMENTS

(75) Inventors: Klaus-Dieter Klein, Koenigsbronn (DE); Thomas Petasch, Aalen (DE); Hartmut Muenker, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 342 days.

(21) Appl. No.: 10/106,962

(22) Filed: Mar. 25, 2002

(65) Prior Publication Data

US 2002/0152627 A1 Oct. 24, 2002

(30) Foreign Application Priority Data

Mar. 30, 2001 (DE) .................. 101 15 915

(51) Int. Cl.
*G02B 26/00* (2006.01)

(52) U.S. Cl. .................. 33/613; 33/1 M; 359/223; 359/224

(58) Field of Classification Search ........... 33/827, 33/1 M, 613, 702, 783, 787, 788, 813, 655, 33/542, 810, 811; 248/316.4, 495, 496, 477; 359/224, 223

See application file for complete search history.

(56) References Cited

U.S. PATENT DOCUMENTS

| | | | |
|---|---|---|---|
| 3,077,958 A * | 2/1963 | Grimsey, Jr. .......... 52/655.1 |
| 3,802,781 A * | 4/1974 | Wright .............. 356/618 |
| 4,060,315 A * | 11/1977 | Heinz ............... 359/876 |
| 4,226,507 A * | 10/1980 | Fuschetto .......... 359/849 |
| 4,408,874 A * | 10/1983 | Zinky et al. ........ 355/52 |
| 4,722,592 A | 2/1988 | Stolfi |
| 4,826,304 A | 5/1989 | Guch, Jr. et al. |
| 4,842,397 A * | 6/1989 | Eisler ............... 359/896 |
| 4,871,237 A | 10/1989 | Anzai et al. |
| 4,953,965 A * | 9/1990 | Iwase et al. ......... 359/872 |
| 4,967,088 A * | 10/1990 | Stengl et al. ........ 250/491.1 |
| 4,969,726 A * | 11/1990 | Koning ............. 359/872 |
| 5,074,654 A * | 12/1991 | Alden et al. ........ 359/849 |
| 5,132,979 A * | 7/1992 | Erbert .............. 372/28 |
| 5,157,555 A | 10/1992 | Reno |
| 5,204,712 A * | 4/1993 | Bouwer et al. ...... 355/53 |
| 5,414,565 A * | 5/1995 | Sullivan et al. ..... 359/872 |
| 5,428,482 A | 6/1995 | Bruning et al. ..... 359/827 |
| 5,438,451 A * | 8/1995 | Schweizer .......... 359/393 |
| 5,642,237 A * | 6/1997 | Miyawaki et al. ... 359/849 |
| 5,784,355 A * | 7/1998 | Abe ................ 369/59.12 |
| 5,870,133 A * | 2/1999 | Naiki .............. 347/247 |
| 5,986,795 A * | 11/1999 | Chapman et al. .... 359/224 |
| 6,054,784 A * | 4/2000 | Sperling et al. ..... 310/12 |
| 6,193,381 B1* | 2/2001 | Holler ............. 359/849 |
| 6,246,052 B1* | 6/2001 | Cleveland et al. ... 250/234 |
| 6,259,571 B1 | 7/2001 | Holderer et al. |

(Continued)

FOREIGN PATENT DOCUMENTS

CH   371906   10/1963

(Continued)

*Primary Examiner*—Diego Gutierrez
*Assistant Examiner*—Amy R. Cohen
(74) *Attorney, Agent, or Firm*—Wells St. John P.S.

(57) ABSTRACT

An apparatus for adjusting devices and for setting adjustments, in particular in a μm range, nm range and below, in particular of optical elements in semiconductor lithography, comprising a base part and a head part spaced apart therefrom, the two parts being connected to one another by at least one adjustment device, and the adjustment device having side parts, the angle of which, or the spacing between which, can be adjusted or set by a length-adjustment device.

47 Claims, 6 Drawing Sheets

U.S. PATENT DOCUMENTS

| | | |
|---|---|---|
| 6,337,484 B1 * | 1/2002 | Loopstra et al. ........ 250/442.11 |
| 6,405,533 B1 * | 6/2002 | Rastegar et al. ............... 60/545 |
| 6,411,426 B1 * | 6/2002 | Meehan et al. ............. 359/291 |
| 6,428,173 B1 * | 8/2002 | Dhuler et al. ................ 359/872 |
| 6,478,434 B1 * | 11/2002 | Streetman et al. .......... 359/872 |
| 6,509,670 B1 * | 1/2003 | Jeong et al. ................. 310/309 |
| 6,594,057 B1 * | 7/2003 | Drake et al. ................. 359/224 |
| 6,597,434 B1 * | 7/2003 | Van Dijsseldonk .......... 355/75 |
| 6,646,719 B1 * | 11/2003 | Lee et al. ...................... 355/72 |
| 6,653,887 B1 * | 11/2003 | Haeusser-Boehm et al. .......................... 327/478 |
| 6,765,712 B1 * | 7/2004 | Van Dijsseldonk et al. . 359/291 |

FOREIGN PATENT DOCUMENTS

| | | |
|---|---|---|
| DE | 3406907 A 1 | 10/1984 |
| DE | 3615930 A1 | 12/1986 |
| DE | 3740515 A1 | 6/1989 |
| DE | 4236355 A1 | 5/1994 |
| DE | 198 25 716 A 1 | 12/1999 |
| DE | 199 10 947 A 1 | 9/2000 |
| EP | 0 053 463 A2 | 6/1982 |
| EP | 0 230 277 A2 | 7/1987 |
| EP | 0471362 B1 | 11/1996 |
| EP | 0 964 281 A1 | 12/1999 |
| EP | 1 209 500 A2 | 5/2002 |

* cited by examiner

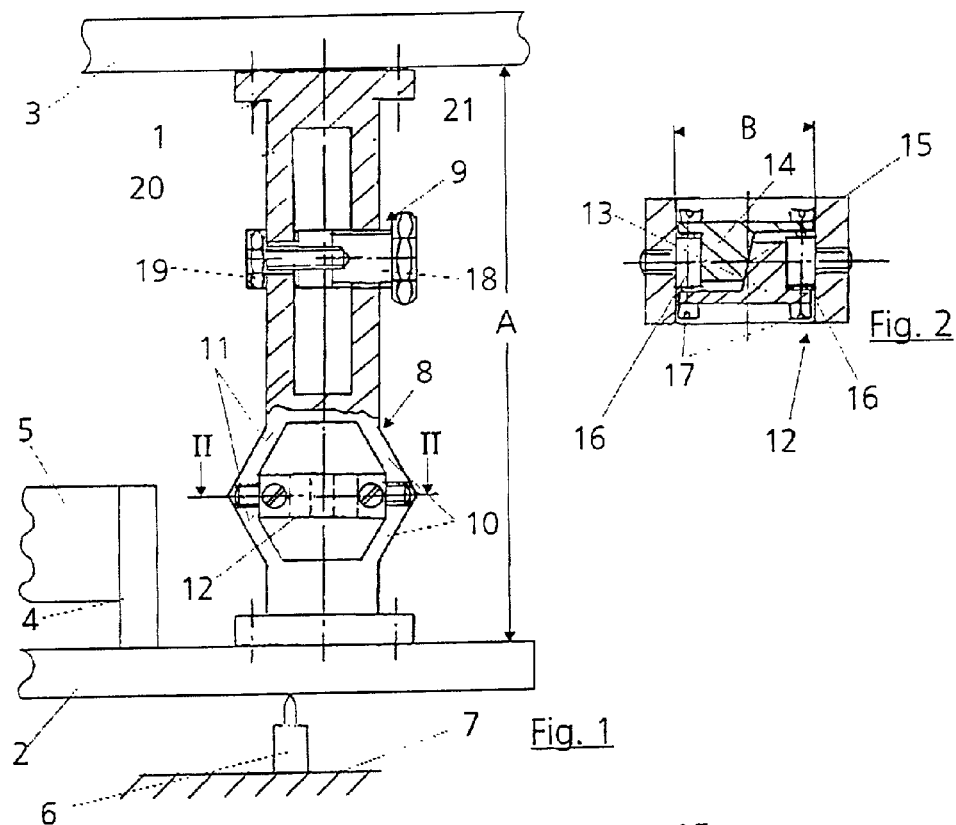
Fig. 1
Fig. 2
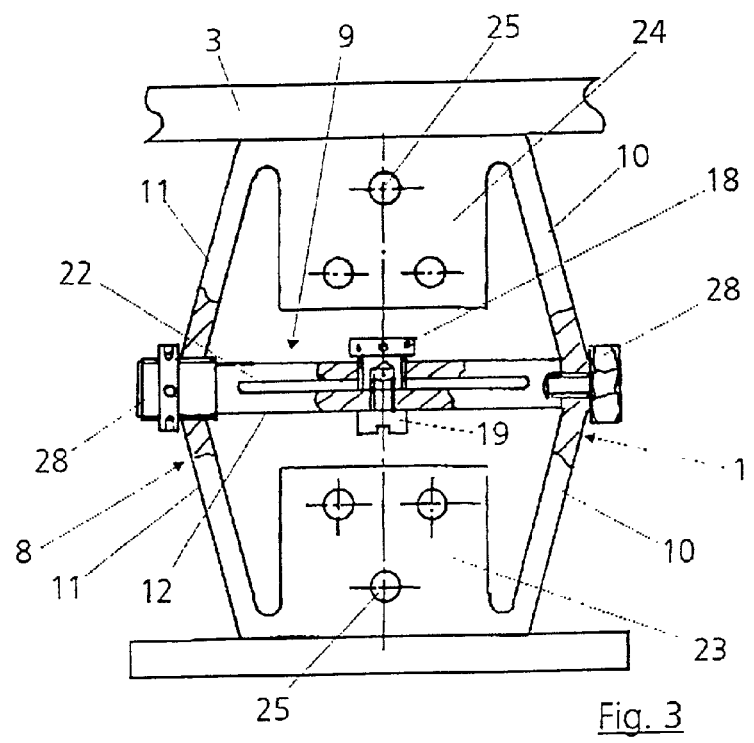
Fig. 3

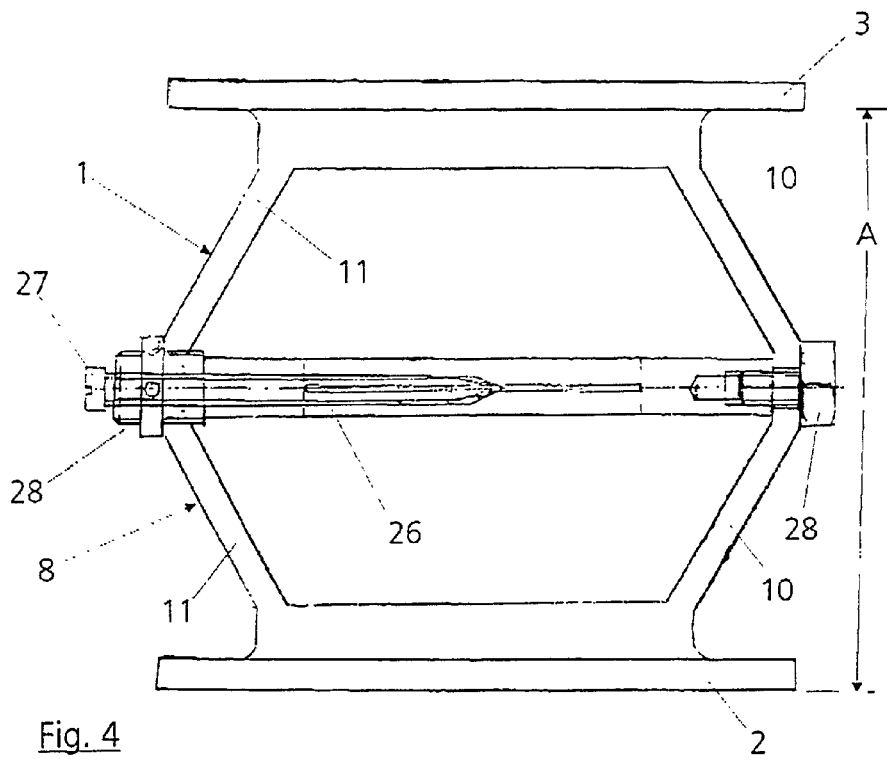
Fig. 4
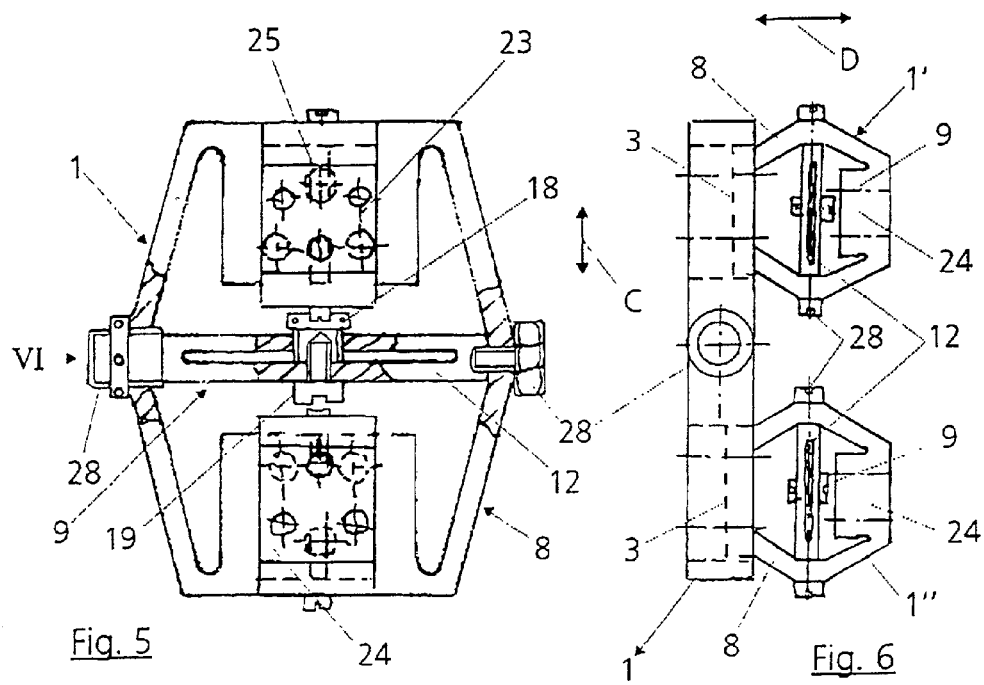
Fig. 5
Fig. 6

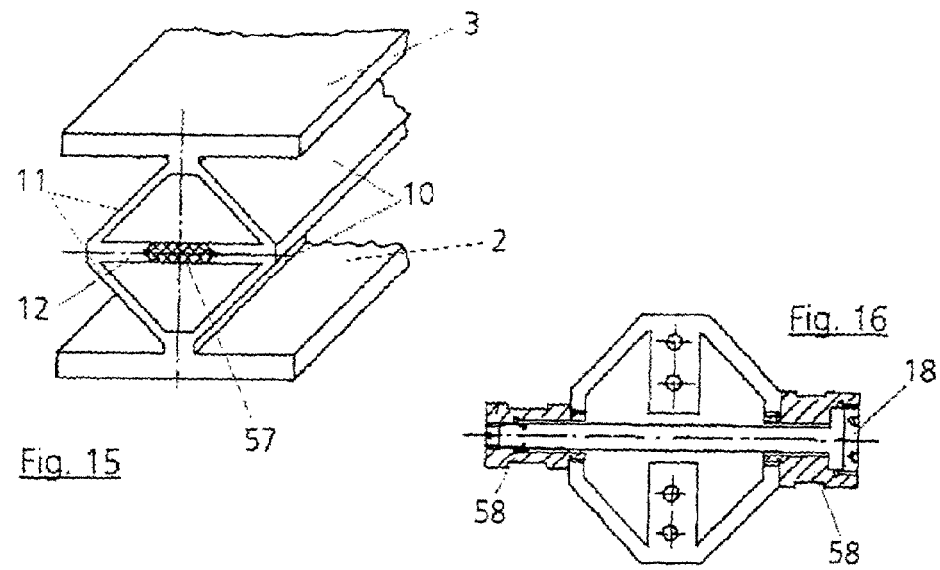
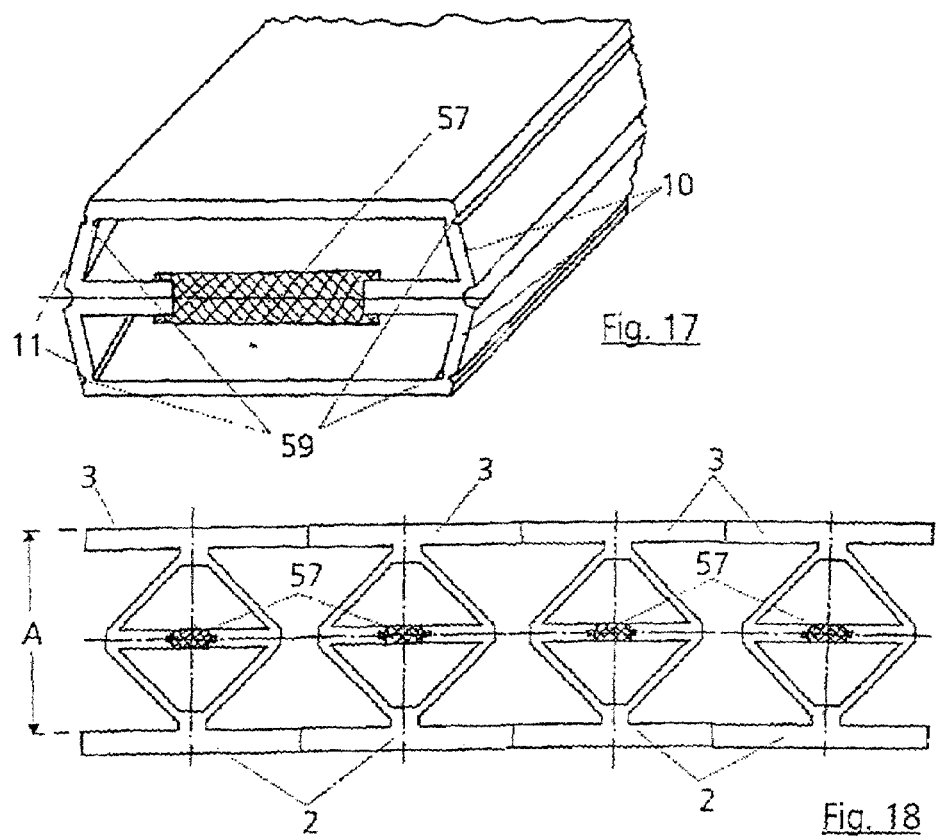

ADJUSTING APPARATUS FOR DEVICES AND FOR SETTING ADJUSTMENTS

CROSS REFERENCE TO RELATED APPLICATIONS

This application relates to and claims priority to corresponding German Patent Application No. 101 15 915.3 filed on Mar. 30, 2001.

BACKGROUND OF THE INVENTION

1. Field of the Invention

The invention relates to an apparatus for adjusting devices and for setting adjustments, in a micrometer range and below. More specifically, the invention relates to an adjusting apparatus for devices and for setting adjustments in a μm range, nm range and below of optical elements in semiconductor lithography.

2. Description of the Related Art

In optics, in particular in microlithography, it is necessary for devices arranged, for example, in projection exposure equipment to be adjusted very precisely in relation to one another. Moreover, there is a need to carry out settings and adjustments in the micrometer range and in the nanometer range. Temperature increases or compensation for temperature differences also require highly precise adjustments.

For the general state of the art, you are referred to DE 37 40 515 A1, EP 0 471 362 B1 and DE 42 36 355 A1, which disclose various adjustment devices, e.g. piezo-ceramic elements as actuators for temperature compensation.

DE 36 15 930 A1 discloses the use of piezo discs in order to achieve mirror movements for setting the displacement length in a ring laser gyroscope. The piezo discs here are clamped between conical elements in order to provide mechanical reinforcement.

SUMMARY OF THE INVENTION

The object of the present invention is to provide an apparatus of the type mentioned in the introduction which allows, with very high accuracy, adjustments of individual elements in relation to one another and very precise adjustments for setting purposes.

The object is achieved according to the invention by an adjusting apparatus for devices and or setting adjustments, in a μm range, nm range and below, having a base part and a head part spaced apart therefrom, the two parts being connected to one another by at least one adjustment device, and the adjustment device having side parts, the angle of which, or the spacing between which, can be adjusted or set by a length-adjustment device.

More specifically the invention relates to an adjusting apparatus for adjusting devices and for setting adjustments in a μm range, nm range and below of optical elements in semiconductor lithography having a base part and a head part spaced apart therefrom, the two parts being connected to one another by at least one adjustment device, and the adjustment device having side parts, the angle of which, or the spacing between which, can be adjusted or set by a length-adjustment device.

The configuration according to the invention of the adjustment device achieves very precise setting and adjustment. The transverse part provides height and length adaptation by way of which—in dependence on the opening angles of the trapezium or parallelogram—correspondingly transmitted changes in height and length occur.

In a very advantageous development of the invention, provision may be made for the length-adjustment device to be provided with a temperature-compensation member.

The temperature-compensation member makes it possible to allow for different coefficients of thermal expansion of the apparatus as a whole, for which purpose it is possible to provide, for example, one or more expansion blocks which counteract the changes in length of the apparatus in the event of a temperature increase. In the optimum case, this can achieve full temperature compensation.

In a further very advantageous configuration of the invention, provision may be made for a precision-adjustment device to be provided in addition, e.g. provided with at least two at least more or less parallel limbs, the spacing between which can be changed by a precision-setting member. In this case, for example two limbs which are arranged parallel to the displacement direction, and are likewise either widened or moved closer together by a transverse beam, likewise serve for setting changes in length, these having considerably more precision than the adjustment device via the side parts arranged in the manner of a double trapezium or parallelogram.

For reasons of stability and also taking account of the fact that the only changes carried out are changes in height and length which take place in a very small range, e.g. in an nm range or micrometer range, solid-state articulations may be provided for the necessary moveable parts for the changes in length.

Mechanical, electrical or hydraulic devices may be provided as the setting and/or adjustment members.

Further advantageous configurations and developments of the invention can be gathered from the exemplary embodiments which are described in principle hereinbelow with reference to the drawing, in which:

BRIEF DESCRIPTION OF THE DRAWINGS

FIG. 1 shows, partially in section, a side view of a configuration according to the invention;

FIG. 2 shows a section along line II—II from FIG. 1;

FIG. 3 shows a precision-adjustment device integrated in a rough-adjustment device;

FIG. 4 shows a similar configuration to FIG. 3, likewise with a precision-adjustment device integrated in a rough-adjustment device;

FIGS. 5 and 6 show a combination of four adjustment apparatuses connected to one another;

FIG. 15 shows a temperature-compensation apparatus on an aluminium profile;

FIG. 16 shows a further configuration of a temperature-compensation apparatus on an aluminium profile with an artificially extended temperature-compensation member;

FIG. 17 shows a temperature-compensation apparatus on an aluminium profile with solid-state articulations, and FIG. 18 shows various profiles with temperature-compensation apparatuses joined together.

DETAILED DESCRIPTION

Figure 7:
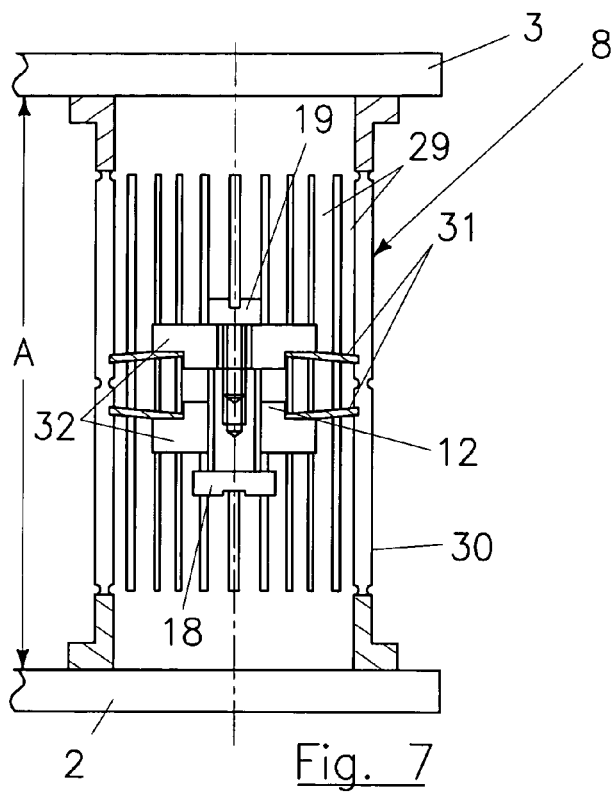
FIG. 7 shows an adjustment apparatus constructed in a rotationally symmetrical manner.

FIGS. 1 and 2 illustrate a first embodiment of the apparatus according to the invention in principle. An adjustment apparatus 1 is arranged between a base plate 2, as base part, and a structure 3, as head part. The base plate 2 may consist, for example, of ceramic material or a similar material and serve as a rest for a mount 4 of an optical element 5, e.g. mirror or lens.

The structure 3 may constitute, for example, a lens-system housing.

Preliminary adjustment, e.g. to an accuracy of 2 μm. takes place via a preliminary adjustment device 6 (not illustrated in any more detail) which is arranged on a measuring plate or bottom plate 7. The structure 3 is generally of rigid design and the spacing A from the base plate 2 is adjusted accurately in relation to it. For this purpose, the adjustment apparatus 1 has a rough-adjustment device 8 and a precision-adjustment device 9.

The rough-adjustment device 8 has side parts 10 and 11 which extend, in the manner of a parallelogram or double trapezium, at an angle to the adjustment direction relating to spacing A.

A transverse part 12 with a length-adjustment device extends between the mutually opposite side parts 10 and 11. The transmission of the change in length in the adjustment direction depends on the oblique-positioning angle of the side parts 10 and 11. An angle of 30° to the adjustment axis is illustrated. An angle of 45° gives a transmission of 1:1. The smaller the angle, the smaller is the transmission ratio. The side parts 10 and 11 are each in one piece and thus form solid-state articulations for adjustment purposes.

The transverse part 12 also serves, at the same time, for temperature compensation. The rough-adjustment device thus performs a double function, first of all as an adjustment mechanism for adapting or changing the length of the spacing A, and secondly for temperature compensation in order for different coefficients of thermal expansion to be compensated for, if possible, largely or even fully. For this purpose, the transverse part 12 is constructed in a number of parts. It has two transverse members 13 and 14 which are arranged in a mirror-inverted manner in relation to the longitudinal axis and consist of a material with a relatively low coefficient of thermal expansion, e.g. invar. An abutment surface 15 between the two transverse members 13 and 14 runs through the longitudinal axis and is located obliquely in relation to the same.

Expansion blocks 16 are located in each case between the transverse members 13 and 14 and the side parts 10 and 11. The expansion blocks 16 are made of a material with a high coefficient of thermal expansion, e.g. aluminium. The spacing B between the mutually opposite side parts 10 and 11 can be changed by screws 17. The negative and positive changes in the spacing B are achieved by the positions of the two transverse members 13 and 14 being changed in relation to one another. Coordination between the two makes it possible to compensate for changes in temperature which would likewise result in changes in spacing B.

The precision-adjustment device 9 has a precision-setting screw 18 with a locking screw 19 arranged on the opposite side. The adjustment apparatus 1, in this region, is divided up into two spaced-apart arms 20 and 21 extending parallel to the adjustment direction. The locking screw 19 is screwed into a threaded bore of the adjustment screw 18. When the adjustment screw 18 is adjusted, the two arms 20 and 21, which are located parallel to one another in the neutral position, are thus curved either inwards or outwards, in which case, in the same way as with the change in the positions of the transverse members 13, 14 in relation to the oblique abutment surface 15, a change in the length A is produced.

A wide range of different adjustment members or actuators are possible for the precision and rough adjustment. A number of solutions therefor are described by way of example hereinbelow, the same designations being used for the same parts or for parts having the same function.

FIG. 3 shows an "interlinking" between the rough-adjustment device 8 and the precision-adjustment device 9. As can be seen here, the precision-adjustment device 9 is integrated in the rough-adjustment device 8. For this purpose, the rough-adjustment device 8, in turn, is provided with the transverse part 12, it being possible, in turn, for a temperature-compensation means to be provided in the transverse part 12. In this configuration, however, the transverse part 12 is divided in two over a large extent by a transverse slot 22. This likewise produces two arms which are located parallel to one another in the neutral position, corresponding to the arms 20 and 21 from FIG. 1, and precision adjustment takes place by the arms being correspondingly curved apart via actuation of the adjustment screw 18.

Reinforcing plates 23 and 24 with fastening bores 25 may be provided for fastening to other parts and for reinforcing purposes.

FIG. 4 shows a similar configuration to FIG. 3, the precision-adjustment device 9 being integrated directly in the rough-adjustment device 8. Instead of the two arms being spread apart, as in the case of FIG. 3, in this case the transverse part 12 is slit and provided with an inner bore. A spreading mandrel 26 with an adjustment head 27 for precision adjustment is inserted into the inner bore. If the head 27 is correspondingly rotated, then the spreading mandrel 26 spreads the two arms correspondingly apart from one another and thus results in a change in length of the transverse part 12 and consequently, on account of the parallelogram form, also in a change in spacing A. The rough adjustment takes place by laterally acting adjustment screws 28, which are screwed into threaded bores of the transverse part 12 to a more or less pronounced extent for length-changing purposes.

FIGS. 5 and 6 show three adjustment apparatuses "interlinked" with one another, to be precise in configurations as have been discussed in FIGS. 1 to 4. This configuration makes it possible to carry out (precision) adjustments in the axial direction and in the lateral direction or—expressed in quite general terms—in two planes which are located perpendicularly to one another. FIG. 5 shows more or less the configuration according to the exemplary embodiment from FIG. 3. In addition, two further adjustment apparatuses 1' and 1" are fastened or., e.g. screwed to, the reinforcing plates 24 and 25. FIG. 6 here shows the view of FIG. 5 from arrow direction VI. The two adjustment apparatuses 1' and 1" here are connected to the reinforcing places 24 and 25 in each case via their structure 3. It is also the case that these two adjustment apparatuses 1' and 1' are of the same construction as the adjustment apparatus according to FIG. 3, the only difference being that only one reinforcing or fastening plate 24 is provided. This means they each have a rough-adjustment device 8 and a precision-adjustment device 9.

It can be seen from FIG. 5 that adjustments act in arrow direction C, while adjustments of the two adjustment apparatuses 1' and 1" result in adjustments according to arrow D, this adjustment taking place perpendicularly to the adjustment according to arrow C. Different actuations of the adjustment devices 1' and 1" also make it possible to set oblique or tilted positions.

The three adjustment apparatuses according to FIGS. 5 and 6 may also be provided with temperature-compensation devices, as is described in FIG. 1. If necessary, the three adjustment apparatuses may also be produced in one piece.

The hitherto described adjustment apparatuses have a level of rigidity such hat a preferred direction is produced.

FIG. 7 illustrates an adjustment apparatus which is constructed in a rotationally symmetrical manner and thus has a high level of rigidity. In this case, use is made of slit bars 29 of a tube 30 which is inserted between the structure 3 and the base part 2. The adjustment device 8 is formed by conical annular clamping elements 31 and two pressure-exerting elements 32, e.g. made of aluminium, which enclose the annular clamping elements 31, which are spaced apart from one another, on the outside. The transverse part 12 connects the two pressure-exerting elements 32 to one another via the adjustment screw 18 and the locking screw 19. With corresponding actuation of the adjustment screw 18, the annular clamping elements 31 force the bars 29 of the tube 30 outwards in a correspondingly symmetrical manner, as a result of which an overall change in length A is achieved. The two annular clamping elements 31 may each comprise a shallow-conical ring made of special hardened spring steel. The axially exerted actuating force causes an elastic change in the cone angle and thus in the diameters of the annular clamping elements 31. If it is the case here that the internal diameter is supported on a spindle, the external diameter increases; if, in contrast, the external diameter of the annular clamping element 31 is supported, the external diameter decreases. In the exemplary embodiment illustrated, support is provided on the inside, for which reason the external diameter is increased and the bars 29 are thus widened outwards, with the spacing A being shortened as a result. It is also the case here that the adjustment apparatus may be constructed in a temperature-compensated manner.

Figure 8:
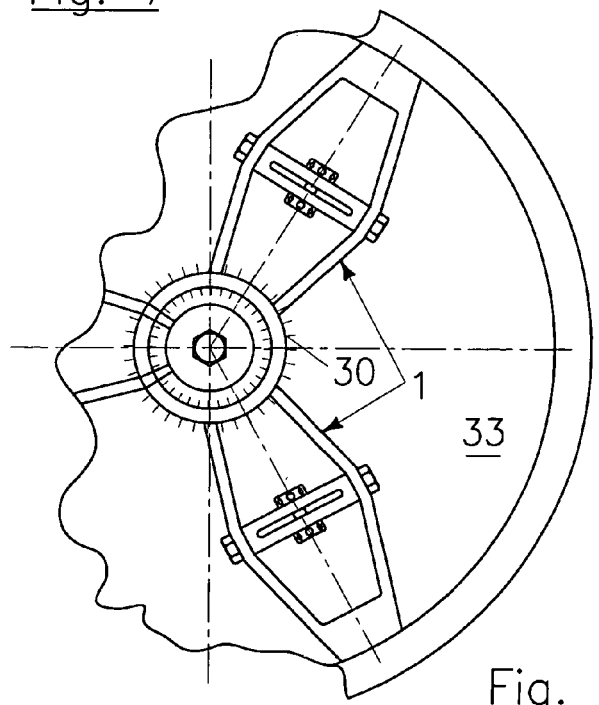
FIG. 8 shows a combination of a rotationally symmetrical adjustment apparatus with three further adjustment apparatuses.

FIG. 8 shows the combination of the embodiment according to FIG. 7 with three adjustment apparatuses according to FIG. 3. The adjustment apparatuses 1, which each have a rough-adjustment device 8 with an integrated precision-adjustment device 9, are located such that they act perpendicularly to the centrally arranged rotationally symmetrical adjustment apparatus according to FIG. 7. This means that the adjustment apparatuses 1 extend radially, or in a spoke-like manner, outwards from the circumferential wall of the tube 30. The adjustment apparatuses 1 are arranged radially on the tube in dependence on the application.

Arrangement may take place in the top region, in the bottom region and also centrally—in relation to the axial length of the tube 30. This combined adjustment apparatus may be provided, for example, for a mirror 33, the adjustment apparatuses 1 acting on the circumferential wall of the mirror 33, while the coaxially arranged adjustment device according to FIG. 7 acts in the axial direction of the mirror 33.

Figure 9:
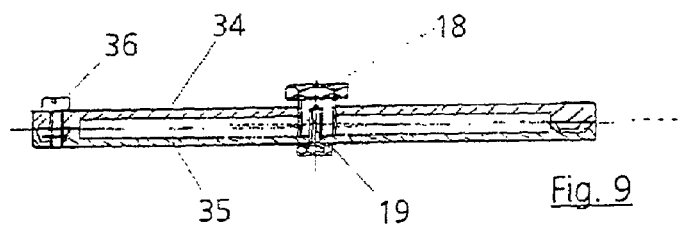
FIGS. 9 and 10 show an adjustment apparatus in disc form.
Figure 10:
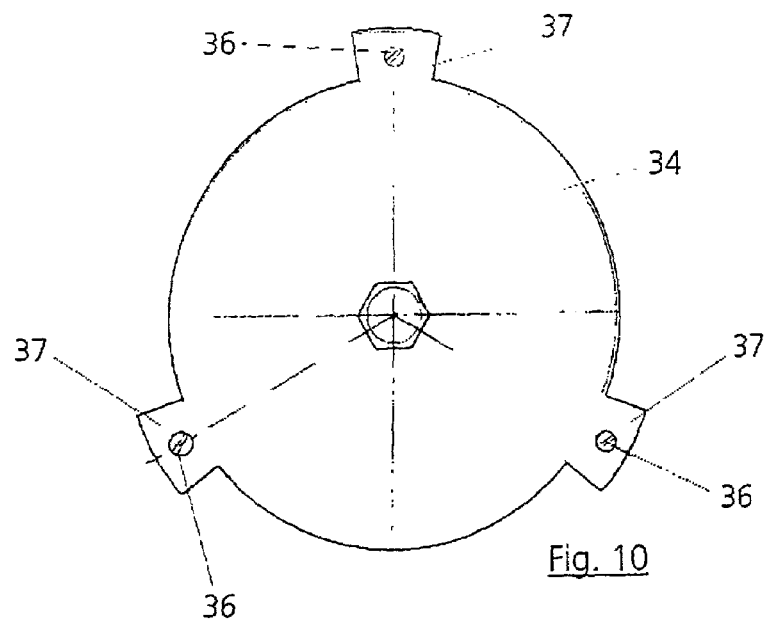

FIGS. 9 and 10 show an adjustment apparatus or possible means for adjusting a diameter. As can be seen, two discs 34 and 35 are connected to one another here in a play-free manner on the circumference by screws 36. As can be seen from FIG. 10, it is possible to provide, for example, three screws 36 which are arranged in corresponding radial widenings 37 of the discs.

As precision-adjustment device 9, in turn, it is possible to provide, between the two discs 34 and 35, an adjustment screw 18 with a locking screw 19 arranged opposite it. Corresponding adjustment to the adjustment screw 18 results in a change in the spacing between the two discs 34 and 35, this producing a diameter adjustment in the nm range. It is also possible to provide here a temperature-compensation means, as well as a rough-setting device 8 corresponding to the exemplary embodiment illustrated in FIG. 1 with correspondingly arranged parallelogram-like side parts between the two discs 34 and 35. Such an embodiment may be used, for example, for specific deformation of a Zerodur mirror.

The above-described exemplary embodiments relate to mechanical adjustment members.

Figure 11:
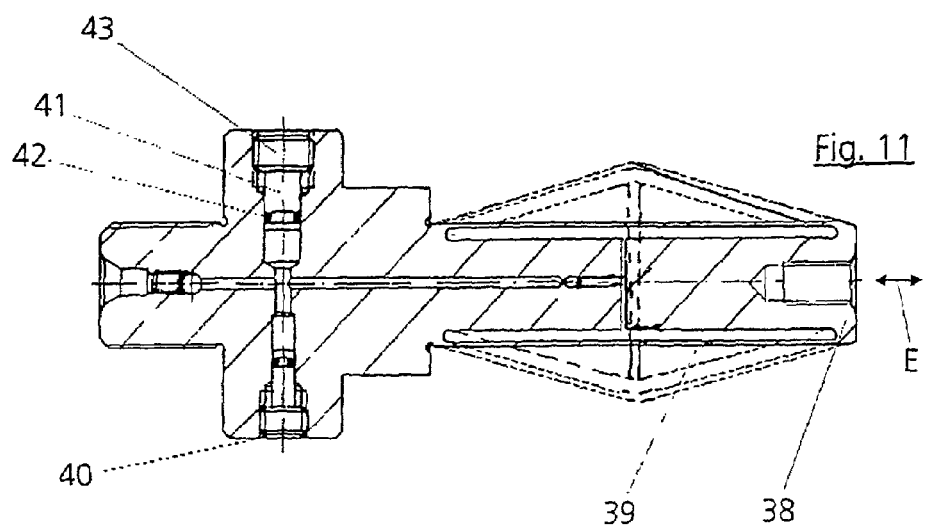
FIG. 11 shows an adjustment apparatus with a hydraulic actuating device.

FIG. 11 illustrates an adjustment apparatus which has a hydraulic spreading principle. As can be seen, the adjustment apparatus here functions in the manner of a hydraulic mandrel using the expansion/spreading principle. In this case, a basic mandrel 38, which serves as a support for an expansion sleeve 39 produced from a high-grade stainless steel, has to be split in the region of the expansion sleeve 39. The hydraulic clasping mandrel is provided with a setting piston 40, a pressure piston 41, a seal 42 for the hydraulic system and a pressure piston 43.

By virtue of the chamber system, which is completely filled with hydraulic oil, being subjected to pressure by means of the pressure piston 41/43, the expansion sleeve 39 widens. With the corresponding pressure increase, the expansion sleeve 39 expands in the form of a balloon (see dashed illustration), as a result of which there is a change in the overall length in the nanometer range according to arrow E.

For a precision-adjustment device 9, the walls of the expansion sleeve 39 run parallel to and/or coaxially with the basic mandrel 38. If a rough-adjustment device 9 is desired, a corresponding parallelogram form—as is illustrated by dashed lines—is preselected and then the walls of the parallelogram expand even further.

Interlinking of the adjustment apparatuses makes it possible to produce adjustment movements in virtually all directions. In conjunction with a rectangle, square, triangle, etc., it is also possible to produce tilting movements with very small displacements and high accuracy. It is also possible for the adjustment apparatuses illustrated to be interlinked more or less in each spreading limb, with the result that, with a normal adjustment apparatus, it is additionally also possible to execute highly accurate tilting movements.

Figure 12:
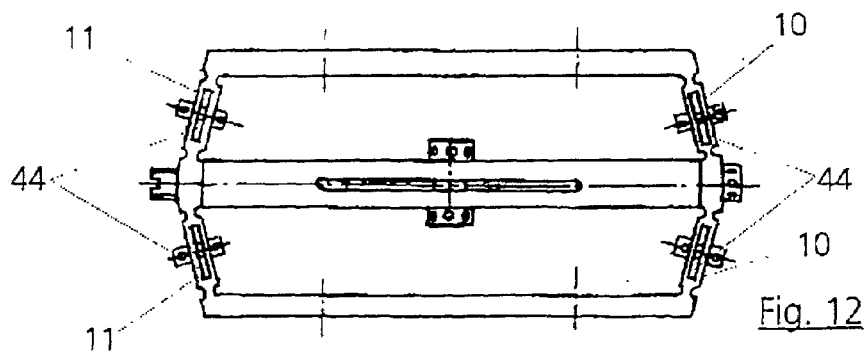
FIG. 12 shows a correlation of different adjustment apparatuses.

Such a configuration is illustrated in principle in FIG. 12. As can be seen, further adjustment apparatuses are integrated in each case in the side arms 10 and 11. For this purpose, the side arms 10 and 11 are each designed in two-armed form with two limbs and/or have appropriately large slots 44 in their interior. The higher-level adjustment apparatus is of the same construction as the exemplary embodiment according to FIG. 3 (without reinforcing plates).

Figure 13:
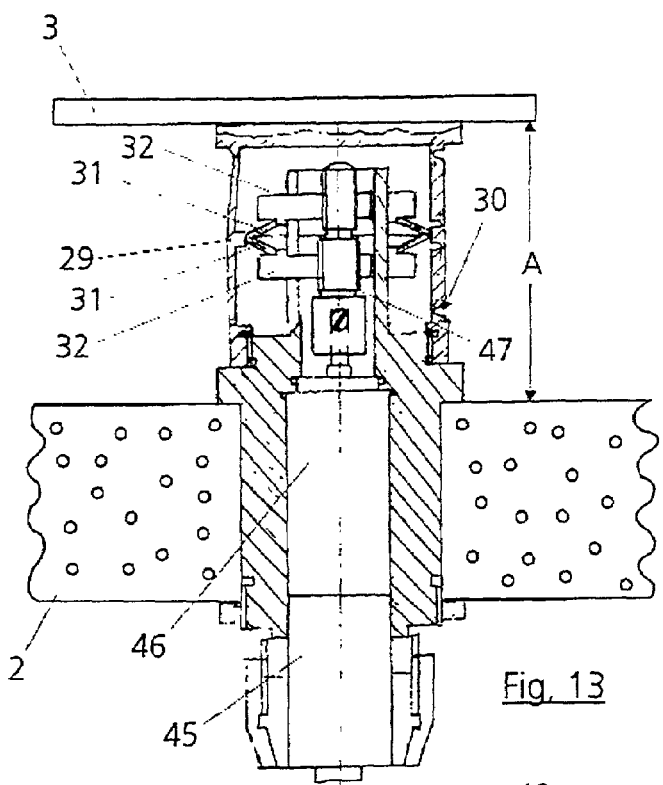
FIG. 13 shows an adjustment apparatus with an electrical adjustment device.

FIG. 13 illustrates an adjustment apparatus in which the adjustment takes place electrically. The change in the spacing A here takes place mechanically by a clamping sleeve according to the exemplary embodiment from FIG. 7 with a tube 30 which is slit to form a multiplicity of bars 29. In the same way, annular clamping elements 31 are provided. The same applies to the pressure-exerting elements 32 For spreading apart with corresponding changes in diameter of the annular clamping elements 31, use is made, then, of a motor 45 with a flanged-on gear mechanism 46. A threaded spindle 47 with a right-hard thread and a left-hand thread is coupled to the output shaft of the gear mechanism. Via the two spindle threads, the pressure-exerting elements 32 are then changed in position in relation to one another, as a result of which the annular clamping elements 31 also change in diameter and the effect of changing the length A is consequently achieved by the bars 29 being correspondingly spread apart.

Figure 14:
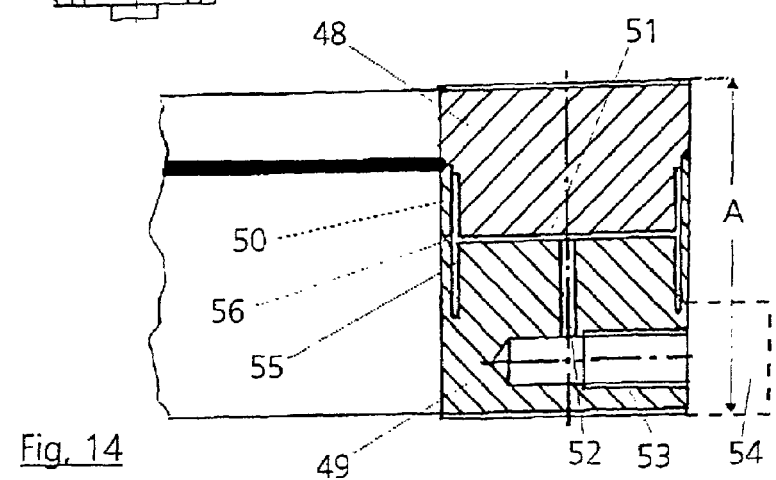
FIG. 14 shows an adjustment apparatus with a hydraulic adjustment means as a lens-spacing ring.

FIG. 14 shows an adjustment apparatus with a hydraulic adjustment means or a hydraulic actuator. The construction here is basically similar to the construction according to FIG. 11. The hydraulic actuator illustrated in this figure may be very small and, in particular, constructed in ring form. This means that the rings may be used, for example, as lens-spacing rings. It is possible here for the lens spacing to be changed statically or dynamically from the outside without the lenses being removed. In this way, once they have been fitted, the lenses may also be readjusted from the outside, to be precise without having to be removed again. In addition to saving a lot of time, this also avoids the situation where the lenses, following removal, become contaminated and then have to be appropriately cleaned.

As can be seen, it is possible to provide for this purpose, for example, a top ring 48 and a bottom ring 49, which together constitute an intermediate lens ring. The ring 49 encloses the top ring 48, with a small spacing between them, by way of a sleeve-like widening 50. The end of the sleeve-like widening 50 may be connected to the top ring 48, For example, by soldering or welding. At the ends, the two rings 48 and 49 are located one above the other with a small spacing between them, an interspace 51 being formed in the process. The interspace 51 is provided, via 2 central bore 52, with a feed line 53 which is connected, in a manner which is not illustrated specifically, to a hydraulic device 54 (illustrated by dashes). In order to change the spacing A, and thus to change the height of the intermediate lens ring, via the hydraulic device 54 (not illustrated in any more detail), fluid is introduced under pressure via the bore 52 into the interspace 51 and the annular chamber 55 between the sleeve-like widening 50 and the circumferential walls of the rings 48 and 49. This produces—as seen in cross section—an H-shaped pressure chamber. If the sleeve-like widening 50 is correspondingly thin-walled and, if appropriate, also provided with an annular groove or recesses 56 in the circumferential wall, then the sleeve-like widening 50 curves outwards, when subjected to corresponding pressure, and thus results in a reduction in the spacing A.

In the case of highly sensitive structures, it is also conceivable to develop extruded aluminium profiles which are temperature-compensated by the principle mentioned in FIG. 1. Aluminium is known to be a material with very poor thermal expansion. On the other hand, it is relatively inexpensive and very easy to process and straightforward to produce by extrusion.

In the case of correct dimensioning, a temperature-compensation device can be used to achieve the situation where the profile does not change in one direction in the event of a change in temperature. The profiles in this case may be screw-connected, welded or interlinked with one another in some other way to form extremely complicated combinations. If required, it is even possible to erode or mill shaped parts into tubular structures.

FIGS. 15 to 18 illustrate basically different possible configurations. The top sides and undersides of the aluminium profile here constitute the same parts as the structure 3 and the base part 2. Also applied here, in the region located therebetween, is the basic idea of the configuration according to FIG. 1 with the rough-setting device 8, combined with the temperature-compensation means. This means that side parts 10 and 11 and a transverse part 12 are provided in the same way. A temperature-compensation part 57, then, is integrated in the transverse part 12 and has a coefficient of thermal expansion which is considerably lower than that of aluminium. An appropriate material selection and dimensioning of the parts may thus achieve the situation where the spacing between the base part 2 and the structure 3 does not change. Plastic may be used, for example, as the temperature-compensation part 57.

FIG. 16 shows a configuration corresponding to the exemplary embodiment from FIG. 3, aluminium being used as the basic material in this case. Furthermore, an adjustment device is also provided by the adjustment screw 18. It is also possible for a precision-adjustment means to be integrated in the transverse part 12. In addition, the transverse part 12 may also be supported in supporting rings 58, which likewise consist of a material with a low coefficient of thermal expansion, e.g. invar.

FIG. 17 shows a configuration in which the two side parts 10 and 11 are connected to the structure 3 and the base part 2 in each case, with a spacing between them, via solid-state articulations 59. It is also the case here that, for temperature-compensation, the transverse part 12 is formed from two different materials, namely from the aluminium material (like the rest of the profile) and from the temperature-compensation part 57 with a lower coefficient of thermal expansion.

By various profiles according to FIGS. 15 and 17 being joined together, or by erosion, milling and the like, all possible compensation elements can be introduced into structures. Such structures may even be accommodated in round parts. Illustrated for this purpose, by way of example, in FIG. 18 are a plurality of profiles according to FIG. 15 joined together.

What is claimed is:

1. A microlithography apparatus with an adjusting apparatus for setting adjustments, comprising:
    a microlithographic optical element mounted on a base part, a head part spaced apart from the base part, the two parts being connected to one another by at least one adjustment device, and the adjustment device having side parts, the angle of which, or the spacing between which, can be adjusted or set by a length-adjustment device in a µm range, nm range and below range, wherein the length-adjustment device has a transverse part which is positioned between the mutually opposite side parts and wherein the side and the transverse parts are arranged in the manner of a double trapezium; and
    wherein the head part is a structure serving as a lens-system housing.

2. Adjusting apparatus according to claim 1, wherein the microlithographic optical element comprises a lens or a mirror.

3. Adjusting apparatus according to claim 1, wherein the length-adjustment device is provided with temperature-compensation members.

4. Adjusting apparatus according to claim 3, wherein the temperature-compensation members have one or more expansion blocks which have coefficients of thermal expansion which counteract the changes in length of the apparatus in the event of a temperature increase.

5. Adjusting apparatus for setting adjustments, comprising: a microlithographic optical element mounted on a base part, a head part spaced apart from the base part, the two parts being connected to one another by at least one adjustment device, and the adjustment device having side parts, the angle of which, or the spacing between which, can be adjusted or set by a length-adjustment device in a μm range, nm range and below range, wherein the length-adjustment device has a transverse part which is positioned between the mutually opposite side parts and wherein the side and the transverse parts are arranged in the manner of a double trapezium; and wherein a precision-adjustment device is provided in addition to the adjustment device.

6. Adjusting apparatus according to claim 5, wherein the precision-adjustment device is integrated in the transverse part with the length-adjustment device.

7. Adjusting apparatus according to claim 5 wherein the transverse part comprises a temperature-compensation member.

8. Adjusting apparatus for setting adjustments, comprising: a microlithographic optical element mounted on a base part, a head part spaced apart from the base part, the two parts being connected to one another by at least one adjustment device, and the adjustment device having side parts, the angle of which, or the spacing between which, can be adjusted or set by a length-adjustment device in a μm range, nm range and below range, wherein the length-adjustment device has a transverse part which is positioned between the mutually opposite side parts and wherein the side and the transverse parts are arranged in the manner of a double trapezium; and wherein at least some of the parts provided for the adjustment are designed as solid-state articulations.

9. Adjusting apparatus according to claim 8, wherein a plurality of adjustment apparatuses are connected to one another in different planes such that adjustments are possible in a number of planes located perpendicularly to one another.

10. Adjusting apparatus according to claim 8, wherein the adjustment device can be actuated by a hydraulic actuating device.

11. Adjusting apparatus according to claim 10, wherein the hydraulic actuating device is provided for a lens-spacing ring which is formed from a bottom ring and a top ring, an adjustment device being formed by a sleeve-like widening, which forms an annular pressure chamber.

12. Adjusting apparatus according to claim 8, wherein the adjustment device can be actuated by an electrical actuating device.

13. Adjusting apparatus according to claim 8, wherein the length-adjustment device is provided with temperature-compensation members, and wherein the temperature-compensation members are integrated in an aluminum profile with a base part and a structure.

14. Adjusting apparatus according to claim 13, wherein the profile is provided with an adjustment device.

15. Adjusting apparatus according to claim 13, wherein the profile has side parts which are provided with solid-state articulations.

16. Adjusting apparatus according to claim 13, wherein a plurality of aluminum profiles which are provided with temperature-compensation members are connected to one another.

17. Adjusting apparatus according to claim 8, wherein the at least one adjustment device is configured for positioning a lens or a mirror.

18. Adjusting apparatus according to claim 8, wherein said side parts are elastically deformable at most of their length.

19. A microlithography apparatus with an adjusting apparatus for setting adjustments and positioning an optical element, comprising:

a base part and a head part spaced apart therefrom, the two parts being connected to one another by at least one adjustment device for adjusting in a μm range, nm range and below range, wherein the adjustment device comprises a rotationally symmetrical tube with an axis, a plurality of slits extending parallel to said axis and bars between said plurality of slits.

20. Adjusting apparatus according to claim 19, wherein the base part serves as a rest for a mount of a lens or a mirror, and further comprising another adjustment device wherein one of the adjustment devices comprises a rough adjustment device and the other of the adjustment devices comprises a precision adjustment device.

21. Adjusting apparatus according to claim 19, wherein the head part is a structure serving as a lens-system housing, and wherein the adjustment device comprises a manually-operated adjustment device.

22. Adjusting apparatus according to claim 19, wherein the adjustment device has conical annular clamping elements for widening the slit bars, which can be actuated by pressure-exerting elements.

23. Adjusting apparatus according to claim 19, wherein the adjustment device comprises a clamping element providing a force against at least one of said bars.

24. Adjusting apparatus according to claim 23, wherein the base part serves as a rest for a mount of a lens or a mirror, and further comprising another adjustment device wherein one of the adjustment devices comprises a rough adjustment device and the other of the adjustment devices comprises a precision adjustment device.

25. Adjusting apparatus according to claim 23, wherein the head part is a structure serving as a lens-system housing, and wherein the adjustment device comprises a manually-operated adjustment device.

26. Adjusting apparatus according to claim 23, wherein the adjustment device has conical annular clamping elements for widening the slit bars, which can be actuated by pressure-exerting elements.

27. A microlithoaraphy apparatus with an adjusting apparatus for setting adjustments and positioning an optical element, comprising:

a base part and a head part spaced apart therefrom, the two parts being connected to one another by at least one adjustment device for adjusting in a μm range, nm range and below range, wherein the adjustment device comprises a rotationally symmetrical tube with an axis, a plurality of slits extending parallel to said axis and bars between said plurality of slits; and wherein the rotationally symmetrical adjustment device is combined with an adjustment device having side parts the angle of which, or the spacing between which, can be adjusted or set by a length-adjustment device, wherein the length-adjustment device has a transverse part which is positioned between the mutually opposite side parts and wherein the side and the transverse parts are arranged in the manner of a double trapezium.

28. Adjusting apparatus according to claim 27, wherein the side and the transverse parts comprise a plurality of circumferentially distributed adjustment devices extending radially outwards from the tube.

29. Adjusting apparatus according to claim 28, wherein the rotationally symmetrical adjustment device and the circumferentially distributed adjustment devices are provided for a mirror or a lens.

30. Adjusting apparatus according to claim 27, wherein the adjustment device comprises a clamping element providing a force against at least one of said bars.

31. Adjusting apparatus according to claim 30, wherein the side and the transverse parts comprise a plurality of circumferentially distributed adjustment devices extending radially outwards from the tube.

32. Adjusting apparatus according to claim 31, wherein the rotationally symmetrical adjustment device and the circumferentially distributed adjustment devices are provided for a mirror or a lens.

33. A microlithography apparatus with an adjusting apparatus for setting adjustments, comprising:
   a semiconductor lithographic optical element mounted on a base part, a head part spaced apart from the base part, the two parts being connected to one another by at least one adjustment device for adjusting in a μm range, nm range and below range, wherein the adjustment device is provided with two discs, the spacing between which can be changed by a precision-adjustment device.

34. Adjusting apparatus according to claim 33, wherein the semiconductor lithographic optical element comprises a lens or a mirror.

35. Adjusting apparatus according to claim 33, wherein the head part is a structure serving as a lens-system housing.

36. Adjusting apparatus according to claim 33, wherein the precision adjustment device comprises an adjustment screw secured between the two discs.

37. A microlithography apparatus with an adjusting apparatus for setting adjustments, and positioning an optical element, comprising: a base part and a head part spaced apart therefrom, the two parts being connected to one another by at least one adjustment device, and the adjustment device having side parts, the angle of which, or the spacing between which, can be adjusted or set by a length-adjustment device in a μm range, nm range and below range, wherein the length-adjustment device has a transverse part which is positioned between the mutually opposite side parts, wherein the side and the transverse parts are arranged in the manner of a double trapezium and wherein a precision-adjustment device is provided in addition to the adjustment device, wherein the precision-adjustment device is provided with at least two substantially parallel limbs, and wherein the spacing between the base part and the head part can be changed by a precision-setting member, which is located between the limbs and which bends them either inwards or outwards.

38. Adjusting apparatus according to claim 37, wherein the base part serves as a rest for a mount of a lens or a mirror.

39. Adjusting apparatus according to claim 37, wherein the head part is a structure serving as a lens-system housing.

40. Adjusting apparatus according to claim 37, wherein said limbs are elastically deformable at most of their length.

41. Adjusting apparatus according to claim 37, wherein the precision-setting adjustment device comprises an adjustment screw secured between the two limbs.

42. A microlithography apparatus with an adjusting apparatus for devices and for setting adjustments, in a μm range, nm range and below, comprising:
   a base part and a head part spaced apart therefrom, the two parts being connected to one another by at least one adjustment device, and the adjustment device having side parts, the angle of which, or the spacing between which, can be adjusted or set by a length-adjustment device, wherein the length-adjustment device has a transverse part which is clamped between mutually opposite side parts;
   a precision-adjustment device positioned in the transverse part and different from the at least one adjustment device;
   wherein the adjusting apparatus is configured for positioning a lens or a mirror in a microlithography apparatus; and
   wherein the length-adjustment device comprises an annular clamping element configured to cooperate with the opposite side parts for the clamping of the transverse part.

43. A microlithography apparatus with an adjusting apparatus for setting adjustments, in a μm range, nm range and below, for positioning an optical element, comprising:
   a base part and a head part spaced apart therefrom, the two parts being connected to one another by at least one adjustment device, wherein the adjustment device comprises a rotationally symmetrical tube with an axis, a plurality of slits extending parallel to said axis and bars between said plurality of slits;
   wherein the base part serves as a rest for a mount of a lens or a mirror; and
   wherein the head part is a structure serving as a lens-system housing.

44. An adjusting apparatus for setting adjustments, comprising:
   a base part;
   a head part spaced apart from the base part; and
   an adjustment device connecting the head part to the base part, the adjustment device comprising:
      a pair of oppositely facing side parts in spaced relation; and
      a transverse part connected between the pair of side parts and comprising a manually adjustable device for adjusting and setting the spaced relation between the pair of side parts, the transverse part and the pair of side parts being arranged in a double trapezium relation, the transverse part comprising two arms spaced apart in parallel relation, and the adjustable device configured to deflect the two arms of the transverse part.

45. Adjusting apparatus according to claim 44, wherein the transverse part intersects the pair of side parts at acute angles.

46. Adjusting apparatus according to claim 44, wherein the transverse part comprises another adjustable device for adjusting and setting the spaced relation between the pair of side parts.

47. Adjusting apparatus according to claim 44, wherein the transverse part defines a transverse slot.

* * * * *

UNITED STATES PATENT AND TRADEMARK OFFICE
CERTIFICATE OF CORRECTION

PATENT NO. : 7,082,693 B2
APPLICATION NO. : 10/106962
DATED : August 1, 2006
INVENTOR(S) : Klaus-Dieter Klein et al.

It is certified that error appears in the above-identified patent and that said Letters Patent is hereby corrected as shown below:

Col. 1, line 46 –
　Replace "adjusting apparatus for devices and or setting adjustments,"
　With --adjusting apparatus for devices and for setting adjustments,--

Col. 2, line 57 –
　Replace "FIG. 12 shows a correlation of different adjustment"
　With --FIG. 12 shows a combination of different adjustment--

Col. 3, line 17 –
　Replace "Preliminary adjustment, e.g. to an accuracy of 2 $\mu$m. takes"
　With --Preliminary adjustment, e.g. to an accuracy of 2 $\mu$m, takes--

Col. 4, line 58 –
　Replace "and 1" are fastened or., e.g. screwed to, the reinforcing plates"
　With --and 1" are fastened on, e.g. screwed to, the reinforcing plates--

Col. 4, line 61 –
　Replace "are connected to the reinforcing places 24 and 25 in each"
　With --are connected to the reinforcing plates 24 and 25 in each--

Col. 4, line 63 –
　Replace "adjustment apparatuses 1' and 1' are of the same construction"
　With --adjustment apparatuses 1' and 1" are of the same construction--

Col. 7, line 1 –
　Replace "same applies to the pressure-exerting elements 32 For"
　With -- same applies to the pressure-exerting elements 32. For --

Col. 7, line 5 –
　Replace "spindle 47 with a right-hard thread and a left-hand thread is"
　With --spindle 47 with a right-hand thread and a left-hand thread is--

Col. 7, line 33 –
　Replace "For example, by soldering or welding. At the ends, the two"
　With --for example, by soldering or welding. At the ends, the two--

Col. 7, line 36 –
　Replace "process. The interspace 51 is provided, via 2 central bore 52,"
　With -- process. The interspace 51 is provided, via a central bore 52,--

UNITED STATES PATENT AND TRADEMARK OFFICE
CERTIFICATE OF CORRECTION

PATENT NO.        : 7,082,693 B2
APPLICATION NO.   : 10/106962
DATED             : August 1, 2006
INVENTOR(S)       : Klaus-Dieter Klein et al.

It is certified that error appears in the above-identified patent and that said Letters Patent is hereby corrected as shown below:

Col. 10, line 48, claim 27 –
 Replace "A microlithoaraphy apparatus with an adjusting"
 With --A microlithography apparatus with an adjusting--

Signed and Sealed this

Twentieth Day of February, 2007

JON W. DUDAS
*Director of the United States Patent and Trademark Office*